United States Patent
Taffer (12)

(10) Patent No.: US 11,854,001 B2
(45) Date of Patent: Dec. 26, 2023

(54) ACCOUNT ENTITY LOCATION BASED NAVIGATION AND DISPLAY FOR A PROJECTABLE TRANSACTION CARD

(71) Applicant: Capital One Services, LLC, McLean, VA (US)

(72) Inventor: Sam Taffer, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 95 days.

(21) Appl. No.: 17/302,414

(22) Filed: May 3, 2021

(65) Prior Publication Data

US 2021/0256502 A1  Aug. 19, 2021

Related U.S. Application Data

(63) Continuation of application No. 16/742,405, filed on Jan. 14, 2020, now Pat. No. 10,997,589.

(51) Int. Cl.
*G06Q 20/34* (2012.01)
*G01C 21/36* (2006.01)

(52) U.S. Cl.
CPC ..... *G06Q 20/3563* (2013.01); *G01C 21/3664* (2013.01)

(58) Field of Classification Search
CPC ............ G06Q 20/341; G06Q 20/3415; G06Q 20/342; G06Q 20/1085; G01C 21/00
See application file for complete search history.

(56) References Cited

U.S. PATENT DOCUMENTS

| | | | |
|---|---|---|---|
| 5,365,448 A * | 11/1994 | Nobe | G01C 21/3605 340/988 |
| 10,554,401 B1 | 2/2020 | Lee | |
| 10,621,574 B1 | 4/2020 | Rao | |
| 10,657,527 B1 | 5/2020 | Easley et al. | |
| 10,789,385 B1 | 9/2020 | Jayapalan et al. | |
| 10,997,589 B1 | 5/2021 | Taffer | |
| 2004/0102898 A1 | 5/2004 | Yokota et al. | |
| 2009/0150294 A1 * | 6/2009 | March | G06Q 20/10 342/357.22 |
| 2012/0143769 A1 | 6/2012 | Krishnan et al. | |
| 2014/0337215 A1 | 11/2014 | Howe | |
| 2017/0336223 A1 * | 11/2017 | Bakshiram | G01C 21/3679 |

(Continued)

*Primary Examiner* — Russell Frejd
*Assistant Examiner* — Sara J Lewandroski
(74) *Attorney, Agent, or Firm* — Harrity & Harrity, LLP

(57) ABSTRACT

A device may determine information that identifies a location of a projectable transaction card. The device may determine that the location of the projectable transaction card is in proximity to a location associated with an account entity. The device may determine navigation information based on determining that the location of the projectable transaction card is in proximity to the location associated with the account entity. The navigation information includes information for navigating from the location of the projectable transaction card to the location associated with the account entity. The device may provide the navigation information for display on a display screen of the projectable transaction card. The navigation information is not provided for display on the display screen of the projectable transaction card prior to the location of the projectable transaction card being in proximity to the location associated with the account entity.

20 Claims, 8 Drawing Sheets

(56) References Cited

U.S. PATENT DOCUMENTS

| | | | |
|---|---|---|---|
| 2018/0341934 A1* | 11/2018 | Rodrigues | G07F 19/209 |
| 2018/0375985 A1* | 12/2018 | Sun | G06Q 20/326 |
| 2019/0114619 A1 | 4/2019 | Wilson | |
| 2019/0156329 A1* | 5/2019 | Lee | G06Q 20/085 |
| 2019/0392427 A1 | 12/2019 | Wilson | |
| 2020/0005279 A1 | 1/2020 | Raquepaw et al. | |
| 2020/0034830 A1 | 1/2020 | Ortiz et al. | |
| 2020/0090161 A1 | 3/2020 | Hay et al. | |

* cited by examiner

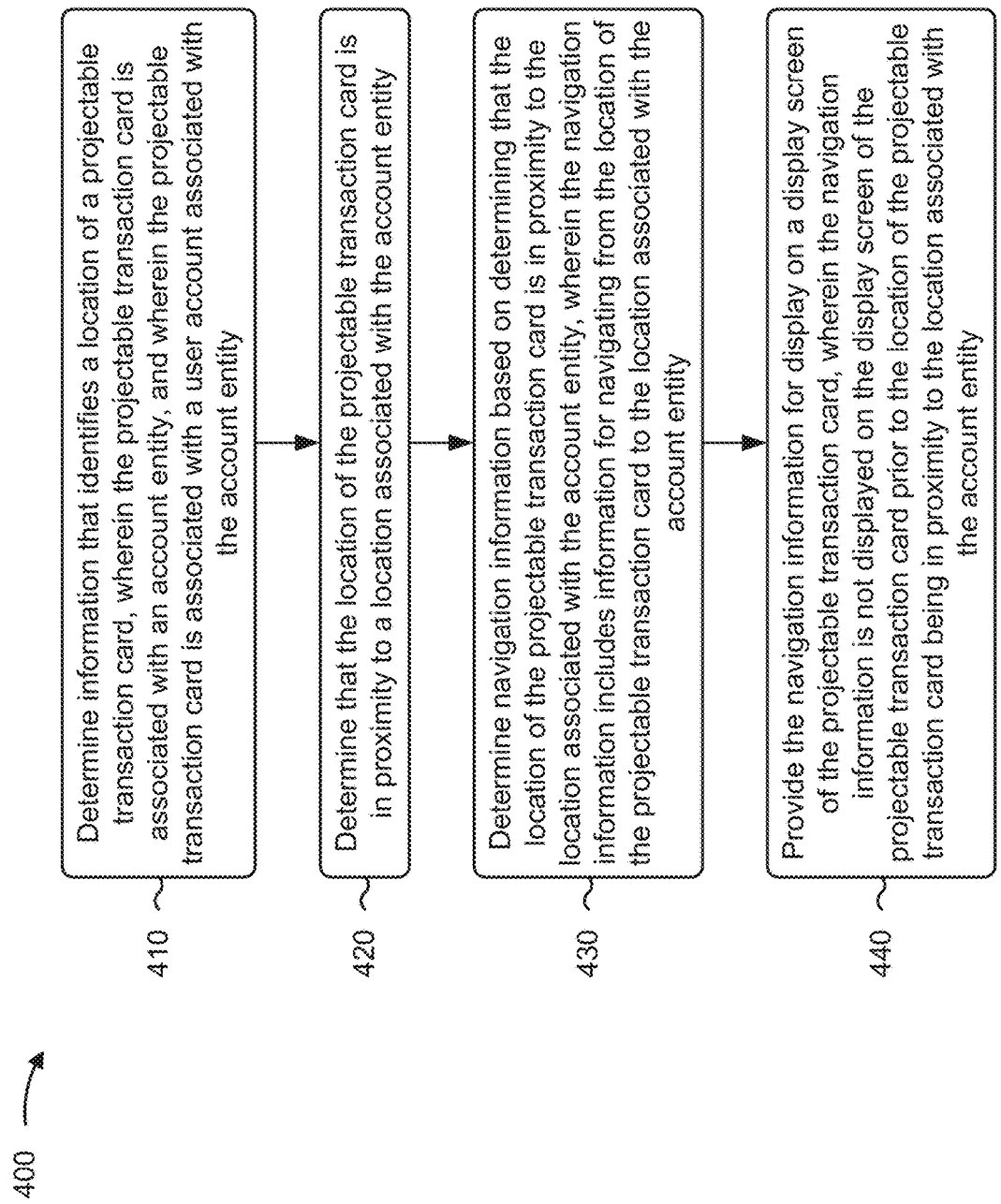

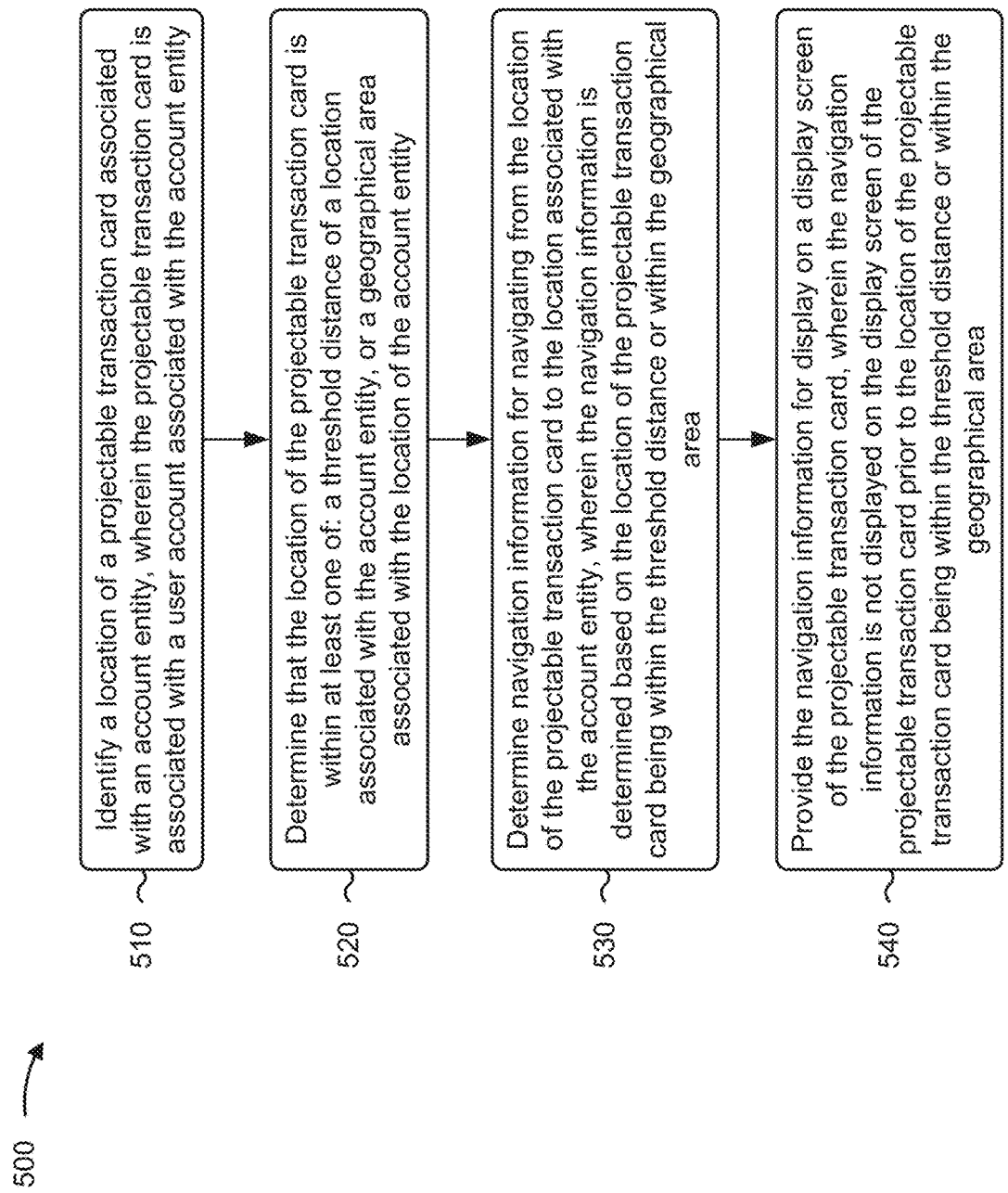

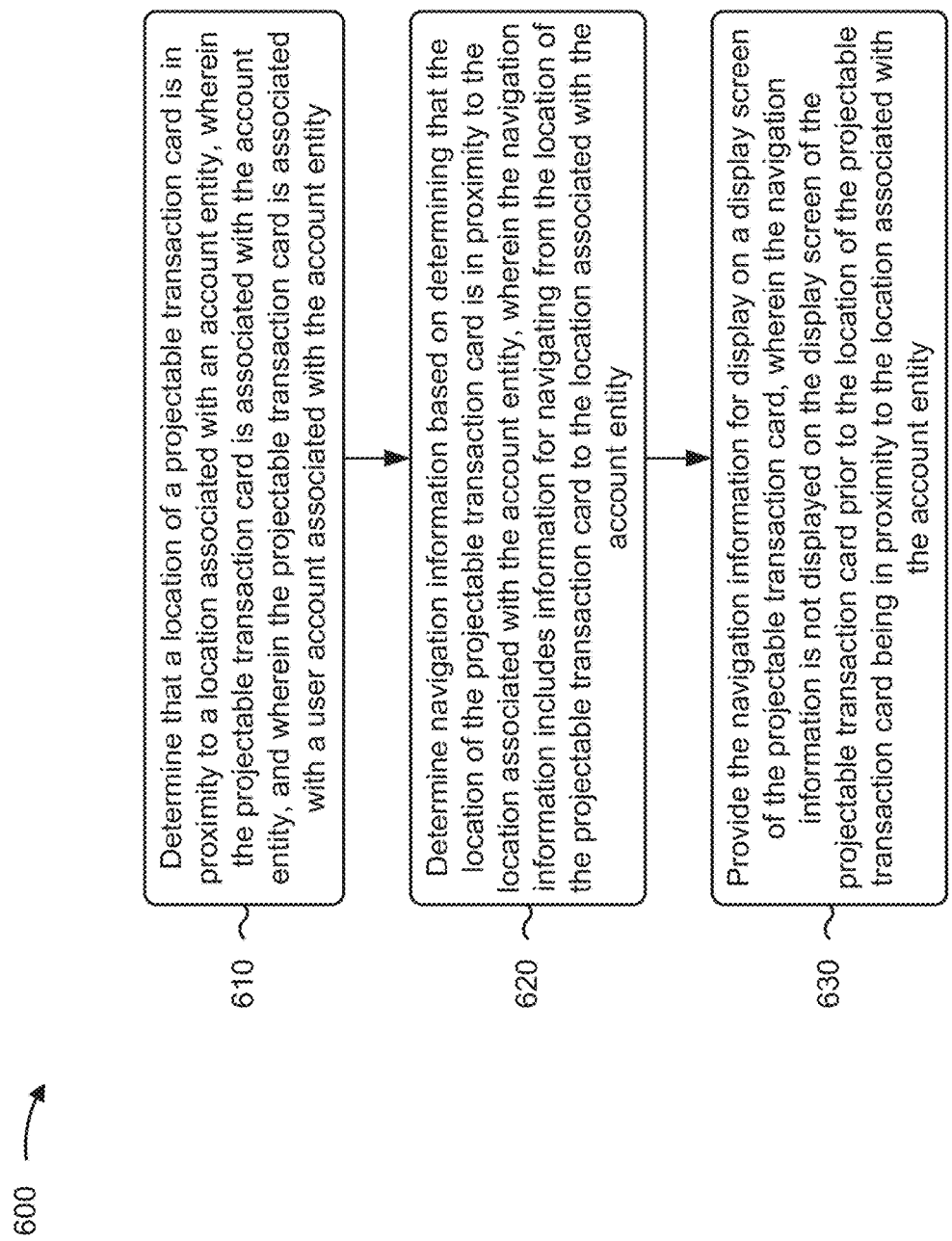

US 11,854,001 B2

ACCOUNT ENTITY LOCATION BASED NAVIGATION AND DISPLAY FOR A PROJECTABLE TRANSACTION CARD

RELATED APPLICATION

This application is a continuation of U.S. patent application Ser. No. 16/742,405, filed Jan. 14, 2020 (now U.S. Pat. No. 10,997,589), which is incorporated herein by reference in its entirety.

BACKGROUND

A user of a transaction card associated with an account entity may want to locate an automated teller machine (ATM), a branch of a financial institution, and/or another location associated with the account entity. For example, the location may provide a way for the user to transact (e.g., deposit, withdraw, or pay a bill) with the account entity via the transaction card.

SUMMARY

According to some implementations, a method may include determining, by a device, information that identifies a location of a projectable transaction card, wherein the projectable transaction card is associated with an account entity, and wherein the projectable transaction card is associated with a user account associated with the account entity; determining, by the device, that the location of the projectable transaction card is in proximity to a location associated with the account entity; determining, by the device, navigation information based on determining that the location of the projectable transaction card is in proximity to the location associated with the account entity, wherein the navigation information includes information for navigating from the location of the projectable transaction card to the location associated with the account entity; and providing, by the device, the navigation information for display on a display screen of the projectable transaction card, wherein the navigation information is not provided for display on the display screen of the projectable transaction card prior to the location of the projectable transaction card being in proximity to the location associated with the account entity.

According to some implementations, a device may include one or more memories; and one or more processors, communicatively coupled to the one or more memories, configured to: identify a location of a projectable transaction card associated with an account entity, wherein the projectable transaction card is associated with a user account associated with the account entity; determine that the location of the projectable transaction card is within at least one of: a threshold distance of a location associated with the account entity, or a geographical area associated with the location of the account entity; determine navigation information for navigating from the location of the projectable transaction card to the location associated with the account entity, wherein the navigation information is determined based on the location of the projectable transaction card being within the threshold distance or within the geographical area; and provide the navigation information for display on a display screen of the projectable transaction card, wherein the navigation information is not provided for display on the display screen of the projectable transaction card prior to the location of the projectable transaction card being within the threshold distance or within the geographical area.

According to some implementations, a non-transitory computer-readable medium may store one or more instructions. The one or more instructions, when executed by one or more processors of a device, may cause the one or more processors to: determine that a location of a projectable transaction card is in proximity to a location associated with an account entity; wherein the projectable transaction card is associated with the account entity, and wherein the projectable transaction card is associated with a user account associated with the account entity; determine navigation information based on determining that the location of the projectable transaction card is in proximity to the location associated with the account entity, wherein the navigation information includes information for navigating from the location of the projectable transaction card to the location associated with the account entity; and provide the navigation information for display on a display screen of the projectable transaction card, wherein the navigation information is not provided for display on the display screen of the projectable transaction card prior to the location of the projectable transaction card being in proximity to the location associated with the account entity.

BRIEF DESCRIPTION OF THE DRAWINGS

FIGS. 4-6 are flowcharts of example processes for account entity location based navigation and display for a projectable transaction card.

DETAILED DESCRIPTION

Figure 1A:
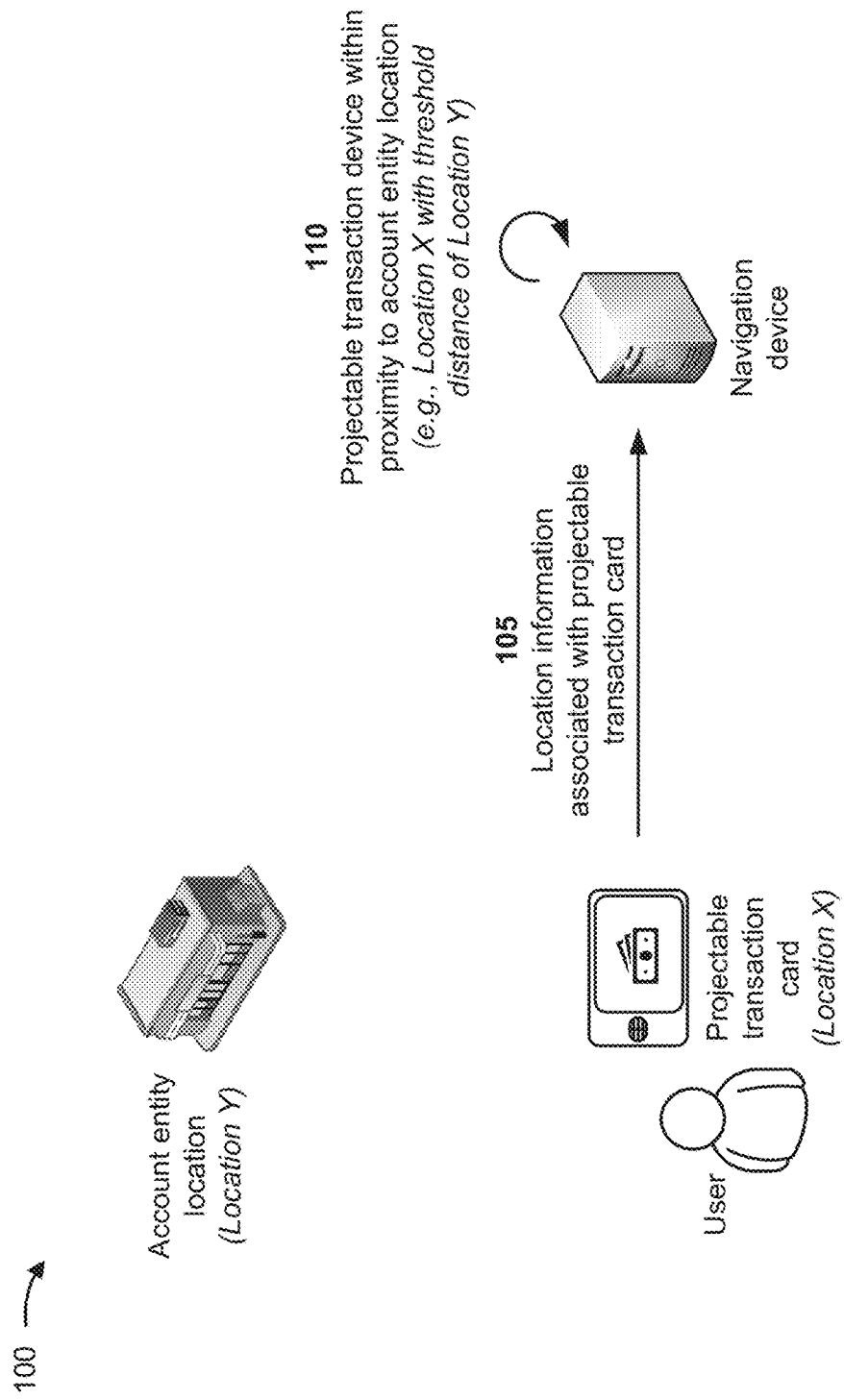
FIGS. 1A-1C are diagrams of one or more example implementations described herein.

The following detailed description of example implementations refers to the accompanying drawings. The same reference numbers in different drawings may identify the same or similar elements.

A transaction card may be associated with a user account, which is also associated with an account entity, such as a bank or other financial institution. The user may want to find a location associated with the account entity, such as an ATM or a branch of a financial institution, so that the user can transact with the account entity. However, the user may be unaware of the location and/or may be unaware of directions to arrive at the location. In some instances, the user may have a need to go to the location, but may forget about the need when the user is near the location.

With advancements in transaction card technology, a transaction card may be a projectable transaction card. A projectable transaction card is a device, capable of being used to conduct a transaction, that includes a display (e.g., a display screen) that can be used to display information (e.g., to a user). Information provided for display via the display of the projectable transaction card may be dynamic and, therefore, can be modified, updated, customized, and/or the like. For example, a display of a projectable transaction card can be updated to display an account identifier, transaction indicator, a name of an account holder associated with the projectable transaction card, and/or the like.

A projectable transaction card may also include a communication interface that enables the projectable transaction card to receive information over a wireless network, such as a wireless telecommunications network, a Wi-Fi network, and/or the like. The information may include information for display via the display of the projectable transaction card. The communication interface may also enable the projectable transaction card to transmit information over the wireless network, such as a selection related to information received over the wireless network.

Some implementations described herein provide techniques and apparatuses associated with providing navigation information for display on a display screen of a projectable transaction card. In some implementations, a navigation device provides the navigation information based on determining that the projectable transaction card is within a threshold distance from a location associated with an account entity or within a geographical area associated with the location associated with the account entity. The location associated with the account entity may be, for example, a location of an ATM or a branch of a financial institution that issued the projectable transaction card.

By providing navigation information for display on a projectable transaction card based on proximity to a location associated with the account entity, a user may be reminded to transact with the account entity and may be provided with information for navigating to a location at which the user may be able to perform a transaction. These techniques may reduce computing resources (e.g., processor resources, memory resources, communication resources, and/or the like) that might otherwise be consumed in response to late payments, account overdrafts, and/or the like.

The techniques may also reduce consumption of computing resources that might otherwise be consumed by using a mobile computing device, such as a mobile phone, to access a navigation application, search for locations associated with the account entity, select a desired location associated with the account entity, and request information for navigating to the desired location associated with the account entity. The techniques may also be helpful when a mobile computing device is unavailable.

The techniques may also provide a dedicated display for displaying the information for navigating to the location associated with the account entity. This may free up computing resources of another device so that the other device can be used for other operations. For example, a user may employ the other device to display a video for a child while using the projectable transaction card to display information for navigating to the location associated with the account entity.

In some implementations, the navigation device may provide the navigation information based on additional factors. For example, when determining to provide the navigation information, the navigation device may consider user preferences, which may be received, for example, via a web interface accessible to the user via a user device, or via an application local to the user device. Additionally, or alternatively, when determining to provide the navigation information, the navigation device may consider historical information, such as information relating to prior transactions between the user and the account entity via the projectable transaction card. In some implementations, when determining to provide the navigation information, the navigation device may consider information relating to the user account, such as an upcoming billing due date, a low or high balance for the user account, and/or the like.

In some implementations, when determining to provide the navigation information, the navigation device may provide a prompt to a user device to request input regarding whether the navigation device should provide the navigation information. The navigation device may provide or not provide the navigation information based on the input. In addition to being a basis for providing navigation information for display to the user, the prompt may also be used as a security measure, such that the user may receive a prompt whenever the projectable transaction card is in proximity to a location associated with the account entity. For example, if a projectable transaction card is stolen, the user may receive the prompt, via a user device, that the projectable transaction card is in proximity to an account entity and may be used to fraudulently transact with the account entity. The user may provide input to alert the account entity that a stolen projectable transaction card is in proximity to a location associated with the account entity. Because the account entity may have a security camera, a fraudulent transaction may be prevented, or a malicious actor may be identified using an image from the security camera. In this way, computing resources may be conserved that otherwise might have been used to identify, investigate, and recover from such fraudulent transaction and/or identity theft.

Figure 1B:
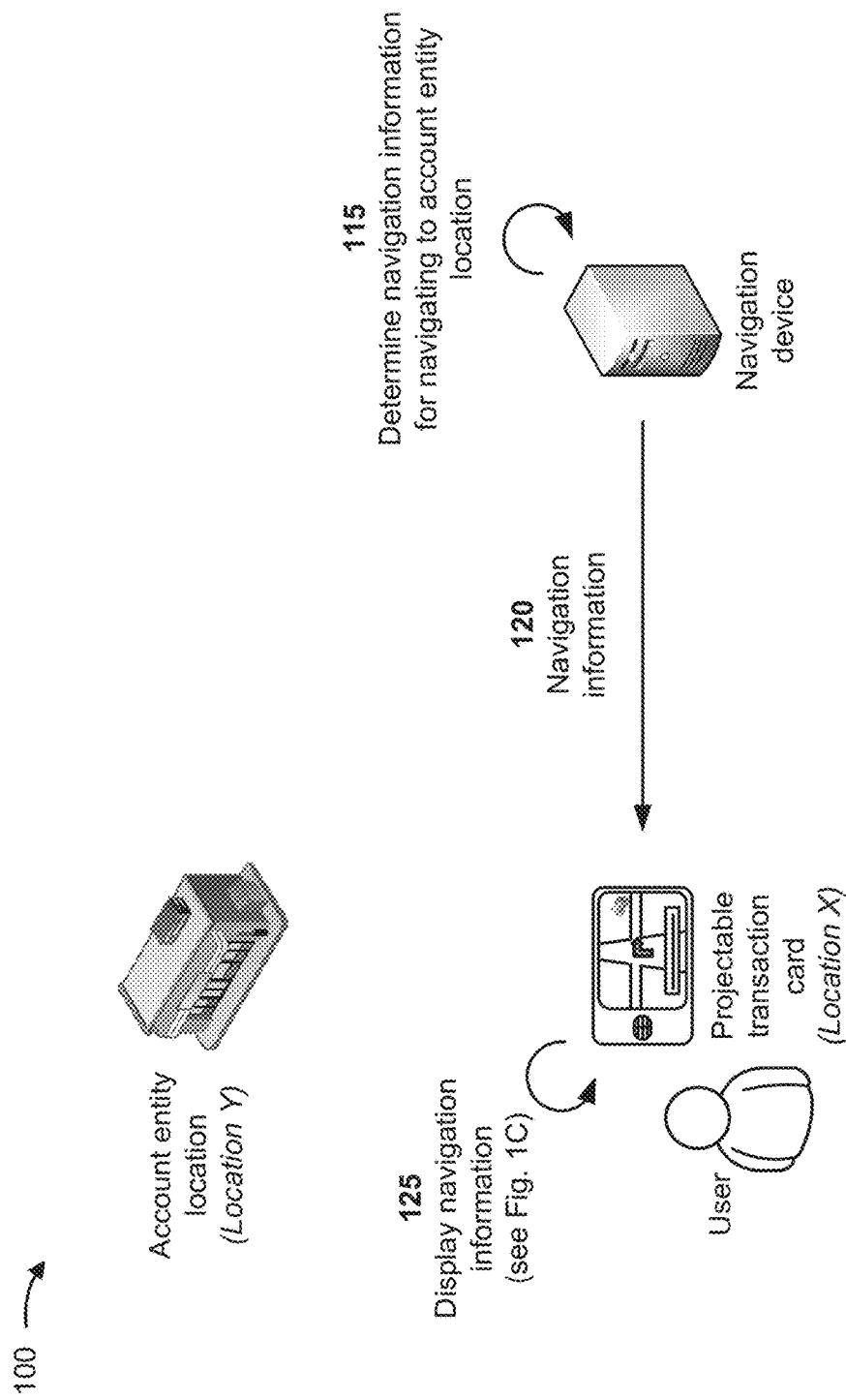
Figure 1C:
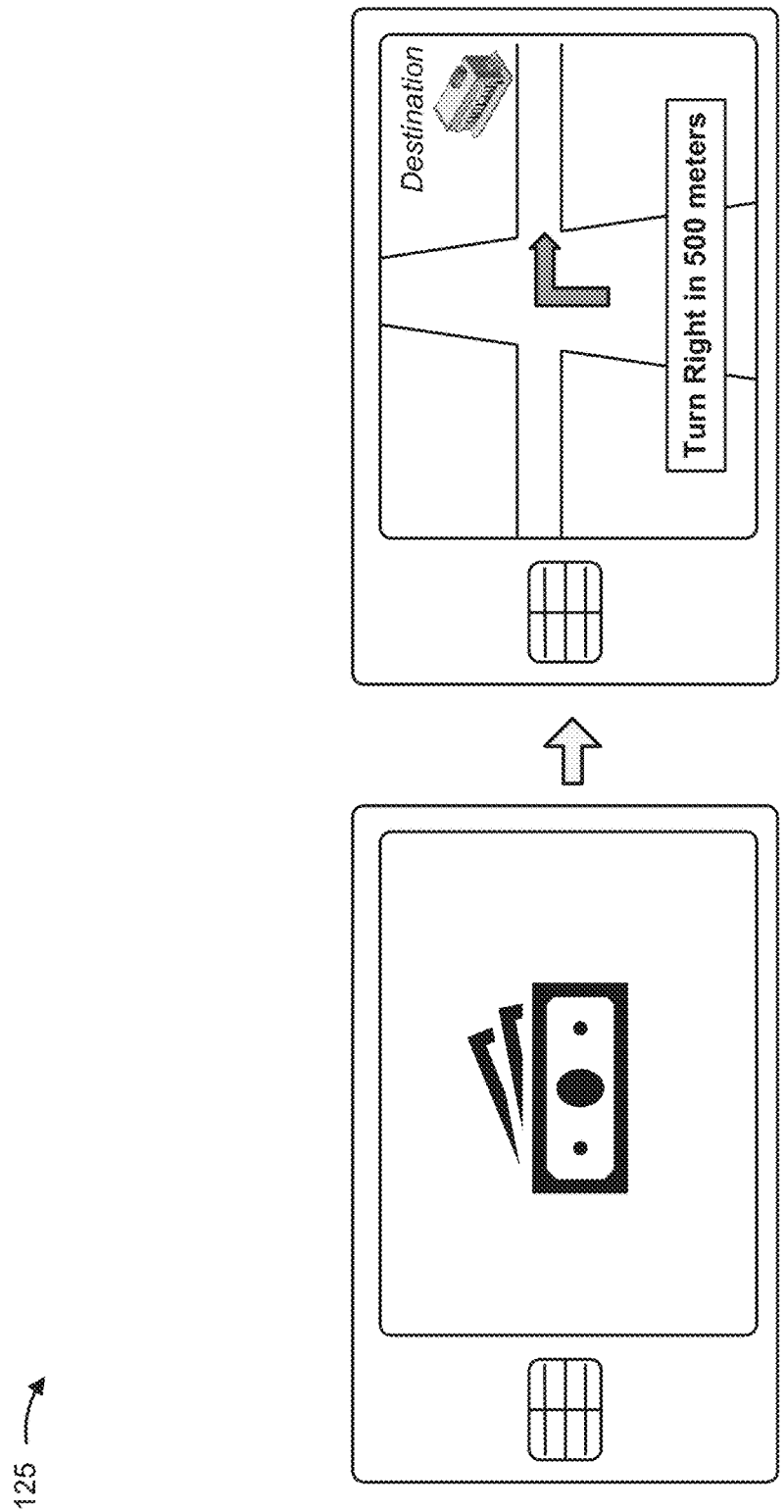

FIGS. 1A-1C are diagrams of one or more example implementations 100 described herein. As shown in FIGS. 1A-1C, the example implementation(s) 100 may include a projectable transaction card and a navigation device.

The projectable transaction card may be associated with an account entity, such as a card issuer and/or a financial institution. The projectable transaction card may also be associated with a user account that is associated with the account entity. In some implementations, the projectable transaction card may provide a method for transacting with the account entity associated with the user account. For example, a user may present the projectable transaction card to a merchant, which can then receive payment from the account entity using the projectable transaction card. The account entity may associate the payment with the user account to reconcile the payment.

The account entity may include one or more account access points, such as ATMs, branches of the account entity, and/or other locations associated with the account entity. A user may be able to present the projectable transaction card at a location associated with the account entity to transact using the user account. For example, the user may withdraw or deposit currency and/or notes, transfer funds between accounts, and/or the like at the location associated with the account entity.

As shown in FIG. 1A, and by reference number 105, the navigation device may receive location information associated with the projectable transaction card. For example, the location information may include information derived from a network, such as a global positioning system network, a local area network, a wide area network, and/or the like, received at the projectable transaction card or a nearby user device (e.g., a mobile phone). The location information associated with the projectable transaction card may provide information regarding a location of the projectable transaction card, a user, and/or a nearby device relative to one or more other locations.

In some implementations, the navigation device may receive the location information from the projectable transaction card in response to user input at the projectable transaction card or a user device. For example, the projectable transaction card may receive input from a user to transmit the location information to the navigation device. Additionally, or alternatively, a nearby user device may receive input from a user to transmit the location information to the navigation device.

In some implementations, a remote device that is not nearby may receive input from a user to transmit the location information to the navigation device. For example, a user that has access to the user account (e.g., a spouse or parent of the nearby user) may request, via the remote device, transmission of the location information associated with the projectable transaction card to the navigation device. The user that has access to the user account may transmit the request via an application interface, for example. The request may be transmitted to the projectable transaction card, a nearby user device, the navigation device, and/or the like. If the request is transmitted to the navigation device, the navigation device may transmit a request for location information to the projectable transaction card, a nearby user device, and/or the like.

In some implementations, the navigation device may receive the location information associated with the projectable transaction card based on user preferences associated with the projectable transaction card, a user account, and/or the like. For example, the user preferences may specify triggers for transmitting the location information, such as expiration of a time interval between iterations of transmitting location information associated with the projectable transaction card, arriving at a scheduled transmission time, entering within a threshold distance between the projectable transaction card and an account entity location, entering within a geographical area, and/or the like. In some implementations, the user preferences may include one or more triggers associated with a status of another device, such as battery status, availability of a display, location, and/or the like.

In some implementations, the navigation device may receive, or have access to, user preferences received via a web interface accessible to the user via a user device or via an application local to the user device. In some implementations, user preferences may be derived based on historical actions taken by the user. For example, the navigation device or another device may use one or more machine learning techniques to generate a model for predicting conditions under which a user prefers to send location information associated with the projectable transaction card. Some example machine learning techniques, which may be used for this purpose, are discussed below.

As shown by reference number 110, the navigation device may determine whether the location of the projectable transaction device is within proximity to a location associated with an account entity ("account entity location"). In some implementations, the navigation device accesses information that identifies one or more account entity locations to determine if one or more of the account entity locations is within proximity to a location of the projectable transaction card, as indicated in the location information. In some implementations, the navigation device may further identify a type of the account entity location. In some implementations, the navigation device may filter account entity locations by type and provide the navigation information if the projectable transaction card is in proximity of an unfiltered location type (e.g., a type of location that passes through the filter, rather than being filtered out). As an example, the location type may indicate that a location includes one or more of a location of a branch of a financial institution, an ATM, an eatery associated with a financial institution or issuer of the projectable transaction card, and/or the like. By filtering account entity locations by type, the navigation device conserves computing resources that would otherwise be used to process all types of account entity locations.

In some implementations, the navigation device may access information that identifies one or more preferred account entity locations or types, according to user preferences or a location associated with the user account, to determine if the projectable transaction card is within proximity to a preferred account entity location or type. By using user preferences, the navigation device conserves computing resources that would otherwise be used to process all account entity locations or types.

In some implementations, when determining whether the projectable transaction card is in proximity to a location associated with the account entity, the navigation device may determine if the projectable transaction card is within at least one of a threshold distance of the location associated with the account entity, a threshold estimated travel time of the location associated with the account entity, or a geographical area associated with the location associated with the account entity.

In some implementations, the user may specify (e.g., in user preferences) the threshold to be used for determining whether the projectable transaction card is in proximity to the location associated with the account entity. In this way, computing resources may be conserved, which might have otherwise been used for determining, generating, and/or providing navigation information when such navigation information is less likely to be useful because the projectable transaction card is not close enough, based on the user's own definition, to the location associated with the account entity.

In some implementations the navigation device may specify the threshold to be used for determining whether the projectable transaction card is in proximity to the location associated with the account entity. In some implementations, the threshold may be a predetermined threshold. In some implementations, the threshold may be based on relationships between historical activity information associated with the user account and historical location information associated with the projectable transaction card and/or historical location information associated with an account entity location. In some implementations, these relationships may be determined using machine learning, such as one or more of the machine learning techniques described herein.

By determining that the projectable transaction card is in proximity to a location associated with an account entity, the navigation device may determine occasions when providing navigation information may be useful to a user of the projectable transaction card. In this way, computing resources may be conserved, which may otherwise have been used for determining, generating, and/or providing navigation information when such navigation information is less likely to be useful because the projectable transaction card is not in proximity to an account entity location.

As shown in FIG. 1B, and by reference number 115, the navigation device determines navigation information for navigating to the location associated with the account entity. In some implementations, the navigation device may determine the navigation information based, at least in part, on determining that the location of the projectable transaction card is in proximity to the location associated with the account entity. By determining the navigation information when the location of the projectable transaction card is in proximity to the location associated with the account entity, the navigation device conserves computing resources that would otherwise be used to determine navigation information for locations that are not in proximity to the location of the projectable transaction card and are unlikely to be of interest to the user.

The navigation information may include information for navigating from the location of the projectable transaction card to the location associated with the account entity. In some implementations, the navigation information may include a list of steps of directions for display, a static or dynamic map for display, and/or the like. Additionally, or alternatively, the navigation information may include navigation information for presenting information via another output component, such as a speaker of the projectable transaction card. For example, the navigation information may provide directions for navigating from the location of the projectable transaction card to the location associated with the account entity, which directions may be presented via audible prompts for upcoming steps of the directions (e.g., an upcoming turn or a distance to remain on a current path).

In some implementations, the navigation device may determine whether to determine the navigation information or to provide the navigation information to the projectable transaction card. For example, the navigation device may determine whether to determine or provide the navigation information based on identifying a type of the location associated with the account entity. In some implementations, the navigation device may filter locations associated with the account entity by type, and provide the navigation information to the projectable transaction card only if the location associated with the account entity is an unfiltered type (e.g., is not filtered out based on type). Additionally, or alternatively, the navigation device may determine whether to determine or provide the navigation information based on whether an upcoming due date, associated with the user account, is within a time threshold. In some of these implementations, the navigation device may determine, or gain access to a determination, of an upcoming due date.

In some implementations, the navigation device determines whether to determine or provide the navigation information based on determining, or gaining access to a determination regarding, historical activity information associated with the user account. The navigation device may then determine, or gain access to a determination by another device, that activity associated with the user account is expected based on the historical activity information. The determination may be made using machine learning, as discussed below.

As described herein, the navigation device may use one or more artificial intelligence techniques, such as machine learning, deep learning, and/or the like to determine whether activity associated with the user account (hereinafter referred to as "account activity") is expected. In some implementations, the navigation device may include an account activity platform. In some implementations, the navigation device may access an account activity platform on another device and/or receive determinations by the account activity platform on the other device.

In some implementations, the account activity platform may parse natural language descriptions of parameters of historical transactions. For example, the account activity platform may obtain data identifying, in natural language, descriptions of timings, locations, amounts, types, and/or the like of historical transactions, and may parse the data to identify indicators relating to patterns of account activity, and/or the like.

In some implementations, the account activity platform may determine a characteristic of a historical transaction based on natural language processing of a description of the historical transaction, which may include a description of characteristics and/or conditions of the historical transaction. For example, based on a description of a historical account activity including "Dec. 5, 2018 deposit of $1,000 at Washington St. branch", the account activity platform may use natural language processing to determine that characteristics of the historical transaction include that the historical transaction was a deposit, the historical transaction was performed on the $5^{th}$ day of the month, and the historical transaction was performed at a particular branch of a financial institution. In this case, the account activity platform may determine that a natural language text corresponds to an indicator of a pattern of account activity based on data relating to other historical account activity, data relating to events of the account (e.g., a bill due date), and/or the like. For example, if historical account activities indicate that the user account often makes a large deposit on or around the $5^{th}$ day of the month, the account activity platform may determine a pattern of account activity. The account activity platform may then determine that if a current date is on or around the $5^{th}$ day of a month, an increased likelihood of upcoming account activity exists. One or more such factors may be weighted in a determination of whether account activity is expected.

In this way, the account activity platform may identify characteristics of historical account activities to determine whether account activity is expected, as described herein. Based on applying a rigorous and automated process associated with identifying characteristics of historical account activities, the account activity platform enables recognition and/or identification of thousands or millions of characteristics of account activities for thousands or millions of transactions, thereby increasing an accuracy and consistency of determining whether account activity is expected relative to requiring computing resources to be allocated for hundreds or thousands of technicians to manually determine whether account activity is expected based on thousands or millions of characteristics of historical account activities.

In some implementations, the account activity platform may determine whether a characteristic of a historical transaction, other events of the account, and/or the like is or can be an indicator of a pattern of account activity or an indicator of whether account activity is expected, as described herein. For example, the account activity platform may determine whether one or more current conditions of a user account (e.g., characteristics of one or more recent transactions, a past or upcoming account event, and/or the like) associated with the account entity is the same or similar to one or more conditions of one or more historical transactions, or if account activity can be expected based on a pattern of historical account activity.

A characteristic of one or more historical transactions can be compared with current conditions to determine whether account activity is expected. In this case, the account activity platform may generate a model of expected account activity. For example, the account activity platform may train a model using information that includes information relating to a plurality of characteristics of historical transactions, a plurality of historical account events, and/or the like, to determine conditions under which account activity is expected. As an example, the account activity platform may determine that past conditions are associated with a threshold probability of being associated with expected account activity. In some implementations, the account activity platform may use a scoring system (e.g., with relatively high scores and/or relatively low scores) to identify and/or classify conditions, or one or more characteristics of conditions, as being associated with expected account activity. In this case, the account activity platform may determine that a relatively high score (e.g., as being likely to be identified) is to be assigned to characteristics of a recent transaction, an account event, and/or other conditions that are determined to be the same or similar as previously identified characteristics of recent transactions, account events, and/or other conditions that were followed by account activity (or more frequently identified than past identified transactions, account events, and/or other conditions). In contrast, the account activity platform may determine that a relatively low score (e.g., as being unlikely to be identified) is to be assigned to characteristics of recent transactions, account events, and/or other conditions that are determined to be different than past identified recent transactions, account events, and/or other conditions that were followed by account activity (or less frequently identified than past identified characteristics).

In some implementations, the account activity platform may perform a data preprocessing operation when generating the model of expected account activity. For example, the account activity platform may preprocess data (e.g., a description of a timing, a location, an amount, a type, and/or the like of a transaction, account events, and/or the like) to remove non-ASCII characters, white spaces, confidential data and/or the like. In this way, the account activity platform may organize thousands, millions, or billions of data entries for machine learning and model generation.

In some implementations, the account activity platform may perform a training operation when generating the model of expected account activity. For example, the account activity platform may portion received information relating to a description of a timing, a location, an amount, a type, and/or the like of a transaction, associations with other transactions or account events, and/or the like into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the account activity platform may preprocess and/or perform dimensionality reduction to reduce the received information relating to a description of a timing, a location, an amount, a type, and/or the like of a transaction, associations with other transactions or account events, and/or the like to a minimum feature set. In some implementations, the account activity platform may train the model of expected account activity on this minimum feature set, thereby reducing processing to train the machine learning model, and may apply a classification technique, to the minimum feature set.

In some implementations, the account activity platform may use a classification technique, such as a logistic regression classification technique, a random forest classification technique, a gradient boosting machine learning (GBM) technique, and/or the like, to determine a categorical outcome (e.g., that account activity is expected, that account activity is not expected, and/or the like). Additionally, or alternatively, the account activity platform may use a naïve Bayesian classifier technique. In this case, the account activity platform may perform binary recursive partitioning to split the data of the minimum feature set into partitions and/or branches and use the partitions and/or branches to perform predictions (e.g., that account activity is or is not expected). Based on using recursive partitioning, the account activity platform may reduce utilization of computing resources relative to manual, linear sorting and analysis of data points, thereby enabling use of thousands, millions, or billions of data points to train a model, which may result in a more accurate model than using fewer data points.

Additionally, or alternatively, the account activity platform may use a support vector machine (SVM) classifier technique to generate a non-linear boundary between data points in the training set. In this case, the non-linear boundary is used to classify test data (e.g., data relating conditions of a user account into a particular class (e.g., a class indicating that account activity is expected, a class indicating that the account activity is not expected, and/or the like).

Additionally, or alternatively, where the test data includes image data, video data, and/or the like, the account activity platform may use a computer vision technique, such as a convolutional neural network technique to assist in classifying test data (e.g., data relating conditions of a user account) into a particular class (e.g., a class indicating that the account activity is expected, a class indicating that the account activity is not expected, and/or the like). In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an object in motion technique (e.g., an optical flow framework and/or the like), and/or the like.

Additionally, or alternatively, the account activity platform may train the model of expected account activity using a supervised training procedure that includes receiving input to the model from a subject matter expert, which may reduce an amount of time, an amount of computing resources, and/or the like to train the model of expected account activity relative to an unsupervised training procedure. In some implementations, the account activity platform may use one or more other model training techniques, such as a neural network technique, a latent semantic indexing technique, and/or the like. For example, the account activity platform may perform an artificial neural network processing technique (e.g., using a two-layer feedforward neural network architecture, a three-layer feedforward neural network architecture, and/or the like) to perform pattern recognition with regard to patterns of whether or not conditions of a user account described using different semantic descriptions can be used to determine whether account activity is expected. In this case, using the artificial neural network processing technique may improve an accuracy of a model (e.g., the model of expected account activity) generated by the account activity platform by being more robust to noisy, imprecise, or incomplete data, and by enabling the account activity platform to detect patterns and/or trends undetectable to human analysts or systems using less-complex techniques.

As an example, the account activity platform may use a supervised multi-label classification technique to train the model. For example, as a first step, the account activity platform may map conditions of a user account to account activity. In this case, the conditions may be characterized as indicating account activity or not indicating account activity based on characteristics of the conditions (e.g., whether timing until an upcoming bill is due is similar or associated with timing until a past bill that resulted in account activity). As a second step, the account activity platform may determine classifier chains, whereby labels of target variables may be correlated (e.g., in this example, labels may be a timing, a location, an amount, a type, and/or the like of a transaction, account events, and/or the like and correlation may refer to a common condition characteristic of a timing, a location, an amount, a type, and/or the like of a transaction, account events, and/or the like). In this case, the account activity platform may use an output of a first label as an input for a second label (as well as one or more input features, which may be other data relating to the condition of a user account), and may determine a likelihood that particular conditions of a user account, that includes a set of characteristics, are associated with expected account activity based on a similarity to other conditions that include similar characteristics that are associated with account activity. In this way, the account activity platform transforms classification from a multilabel-classification problem to multiple single-classification problems, thereby reducing processing utilization. As a third step, the account activity platform may determine a Hamming Loss Metric relating to an accuracy of a label in performing a classification by using the validation set of the data. For example, an accuracy with which a weighting applied to each characteristic of conditions of a user account and whether each characteristic is associated with expected account activity or not, results in a prediction of whether the expected account activity can correctly be determined, thereby accounting for differing amounts to which association of any one characteristic influences determination of expected account activity. As a fourth step, the account activity platform may finalize the model based on labels that satisfy a threshold accuracy associated with the Hamming Loss Metric and may use the model for subsequent prediction of whether conditions of a user account are to result in the determination of expected account activity.

As another example, the account activity platform may determine, using a linear regression technique, that a threshold percentage of characteristics of conditions of a user account, in a set of characteristics, do not result in expected account activity, and may determine that those characteristics are to receive relatively low association scores. In contrast, the account activity platform may determine that another threshold percentage of characteristics of conditions of a user account result in expected account activity, and may assign a relatively high association score to those characteristics. Based on the characteristics resulting in expected activity or not, the account activity platform may generate the model of expected account activity and may use the model of expected account activity for analyzing new conditions of a user account, and/or the like that the account activity platform identifies.

In some implementations, a different device, such as a server device, may generate and train the model. The different device may send the model for use by the account activity platform. The different device may update and send (e.g., on a scheduled basis, on an on-demand basis, on a triggered basis, on a periodic basis, and/or the like) the model to the account activity platform.

Accordingly, the account activity platform may use any number of artificial intelligence techniques, machine learning techniques, deep learning techniques, and/or the like to determine whether activity associated with a user account is expected.

As shown by reference number 120, the navigation device may provide the navigation information to the projectable transaction card. In some implementations, the navigation device may provide the navigation information based on one or more factors, which may include a determination that the projectable transaction card is in proximity to a location associated with the account entity (e.g., within a threshold distance of and/or within a geographical area associated with the account entity location), an identification of a type of the account entity location, an indication received via the projectable transaction card or a nearby user device that the navigation information is desired by the user, expected activity associated with a user account based on historical activity information, and/or the like.

For example, the navigation device may provide, for display or other output, a user interface associated with whether to display or output the navigation information. In some implementations, the user interface may be provided via the projectable transaction card. In some implementations, the user interface may be provided via a nearby user device, such as a mobile phone. In some implementations, the user interface may be provided via a local application associated with the account entity, a messaging application, an interactive webpage, and/or the like. For example, the navigation device may determine that the projectable transaction card is in proximity to a location associated with the account entity, provide a user interface to request input regarding whether to display the navigation information at the projectable transaction card, and then provide or not provide the navigation information to the projectable transaction card based on an indication of the input.

As shown by reference number 125, the projectable transaction card may display the navigation information. Although the illustrated implementation(s) 100 shows the navigation information being presented via a display, the navigation information may additionally or alternatively be presented via another type of output component, such as a speaker of the projectable transaction card or another type of transaction card.

By providing the navigation information to the projectable transaction card for display on the display of the projectable transaction card, computing resources of a nearby user device may be conserved. For example, a display of the nearby user device may be used to display other information or not display any information.

As shown by FIG. 1C, information displayed on a display of the projectable transaction card may dynamically change. For example, the projectable transaction card may change to display navigation information from displaying an account identifier, a transaction indicator, a name of the account holder, and/or the like, where the navigation information is not provided for display on the display screen of the projectable transaction card prior to the location of the projectable transaction card being in proximity to the account entity location.

In some implementations, the navigation information may be displayed as one or more of alphanumeric characters providing one or more steps for directions, a map including a part or entirety of a route to the account entity location, and/or symbols (e.g., arrows and/or the like).

In some implementations, the navigation device may determine (e.g., via an update from the projectable transaction card) information that identifies an updated location of the projectable transaction card. The navigation device may determine that the updated location is not in proximity to the location associated with the account entity. Based on this determination, the navigation device may cause the navigation information to stop being displayed on the display screen of the projectable transaction card. This may conserve computing resources including those that would otherwise be used to display the navigation information at the projectable transaction card, communicate updates of directions to the projectable transaction card, receive updates of locations from the projectable transaction card, and/or the like.

As indicated above, FIGS. 1A-1C are provided as one or more examples. Other examples may differ from what is described with regard to FIGS. 1A-1C.

For example, in some implementations, the projectable transaction card may be location aware. The projectable transaction card may also be configured with identifications of one or more locations associated with the account entity that is associated with the projectable transaction card, such that the projectable transaction card may detect when the projectable transaction card is in proximity to a location associated with the account entity. The projectable transaction card may have access (e.g., local access) to a set of maps, or other location data, and may be able to determine navigation information based on determining that the location of the projectable transaction card is in proximity to the location associated with the account entity.

Figure 2:
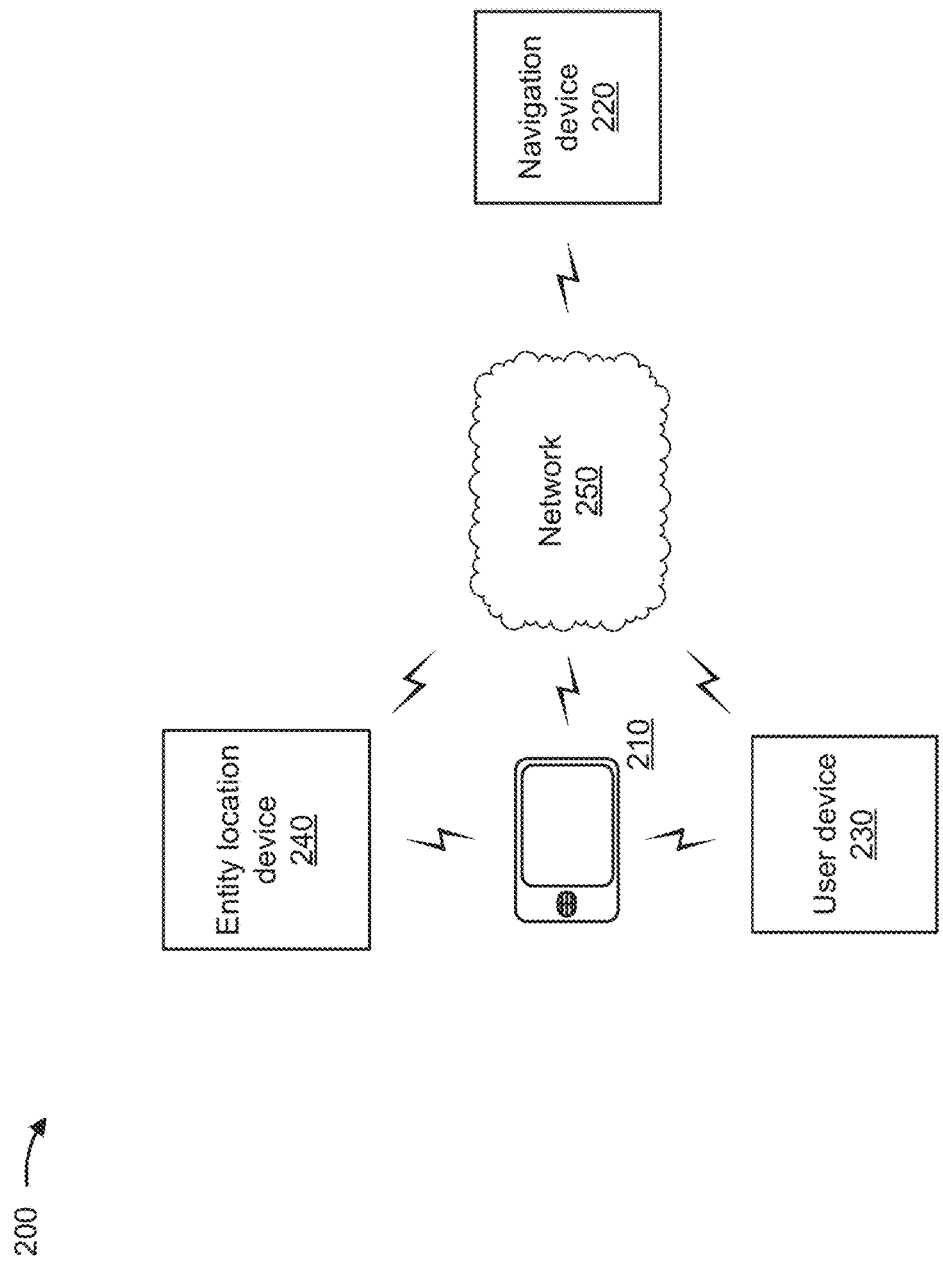
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a projectable transaction card 210, a navigation device 220, a user device 230, an entity location device 240, and a network 250. Devices of environment 200 may interconnect via wired connections, wireless connections, or a combination of wired and wireless connections.

Projectable transaction card 210 includes a transaction card capable of displaying information via a display, as described herein. In some implementations, projectable transaction card 210 is capable of communicating with one or more other devices of environment 200 (e.g., via Bluetooth communication, communication, Wi-Fi communication, a near field communication session, via a cellular network, and/or the like). Projectable transaction card 210 is capable of communicating data for a transaction and/or information that identifies a location of the projectable transaction card. For example, projectable transaction card 210 may communicate data including a virtual transaction number, transaction card identification information (e.g., an account identifier, a cardholder identifier, and/or the like), account information, banking information, and/or the like, associated with performing a transaction. For example, to communicate the data, projectable transaction card 210 may include a magnetic strip and/or an integrated circuit (IC) chip (e.g., a EUROPAY®, MASTERCARD®, VISA® (EMV) chip).

Projectable transaction card 210 may include a display (e.g., a display screen) that can be used to display information. Information provided for display via the display of projectable transaction card 210 may be dynamic and, therefore, can be modified, updated, customized, and/or the like. For example, a display of projectable transaction card 210 can be updated to display a visual representation of navigation information. In some implementations, projectable transaction card 210 includes one or more other output components that may be configured to dynamically present information. For example, projectable transaction card 210 may include a speaker that can dynamically present audible information.

Projectable transaction card 210 may also include a communication interface that enables projectable transaction card 210 to receive information over a network, such as a wireless telecommunications network, a Wi-Fi network, and/or the like. In some implementations, the information may include information for display via the display of the projectable transaction card. The communication interface may also enable projectable transaction card 210 to transmit information over network 250, such as information that identifies a location of projectable transaction card 210 and/or information that indicates user input regarding whether navigation information is to be displayed by projectable transaction card 210.

In some implementations, projectable transaction card 210 may be configured to communicate directly with user device 230 and/or entity location device 240. In some implementations, projectable transaction card 210 may transmit and/or receive information over network 250. In some implementations, projectable transaction card 210 may use one or both of user device 230 or entity location device 240 to communicate over network 250. For example, projectable transaction card 210 may provide information that identifies a location of projectable transaction card 210 to user device 230 for transmission to navigation device 220. Additionally, or alternatively, projectable transaction card 210 may receive information, such as navigation information, from navigation device 220 via user device 230.

Navigation device 220 includes one or more devices capable of receiving, generating, storing, processing, and/or providing information associated with determining and/or providing navigation information for navigating from a location associated with projectable transaction card 210 to a location associated with an account entity. For example, navigation device 220 may include a server device (e.g., a host server, a web server, an application server, etc.), a data center device, a cloud computing device in a cloud computing environment, or a similar device. In some implementations, navigation device 220 may receive information that identifies a location of a projectable transaction card 210, access information that identifies a location associated with the account entity, and determine information for navigating from the location of projectable transaction card 210 to the location associated with the account entity. In some implementations, navigation device 220 may determine the information for navigating based on providing information regarding the locations to another device and receiving the information for navigating from the other device.

In some implementations, navigation device 220 may determine whether to provide the navigation information to projectable transaction card 210 based on whether projectable transaction card 210 is in proximity to the location associated with the account entity. Navigation device 220 may make this determination before or after determining the information for navigating from the location of the location of projectable transaction card 210 to the location associated with the account entity. In some implementations, the information for navigating may be used as a basis for providing the navigation information.

User device 230 includes one or more devices capable of receiving, generating, storing, processing, and/or providing information associated with navigation device 220 providing navigation information to projectable transaction card 210. For example, user device 230 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Entity location device 240 includes one or more devices capable of receiving, generating, storing, processing, and/or providing information associated with determining and/or providing navigation information for navigating from a location associated with projectable transaction card 210 to a location associated with an account entity. For example, entity location device 240 may include a communication and/or computing device, such as a mobile phone (e.g., a smart phone, a radiotelephone, etc.), a laptop computer, tablet computer, a handheld computer, a desktop computer, a server device (e.g., a host server, a web server, an application server, etc.), and/or the like.

Entity location device 240 may communicate with one or more of projectable transaction card 210, user device 230, or navigation device 220. In some implementations, entity location device 240 may provide information, such as information that identifies a location of one or more locations associated with the account entity. In some implementations, entity location device 240 may be positioned within one or more locations associated with the account entity (e.g., at a location including a branch of a financial institution).

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
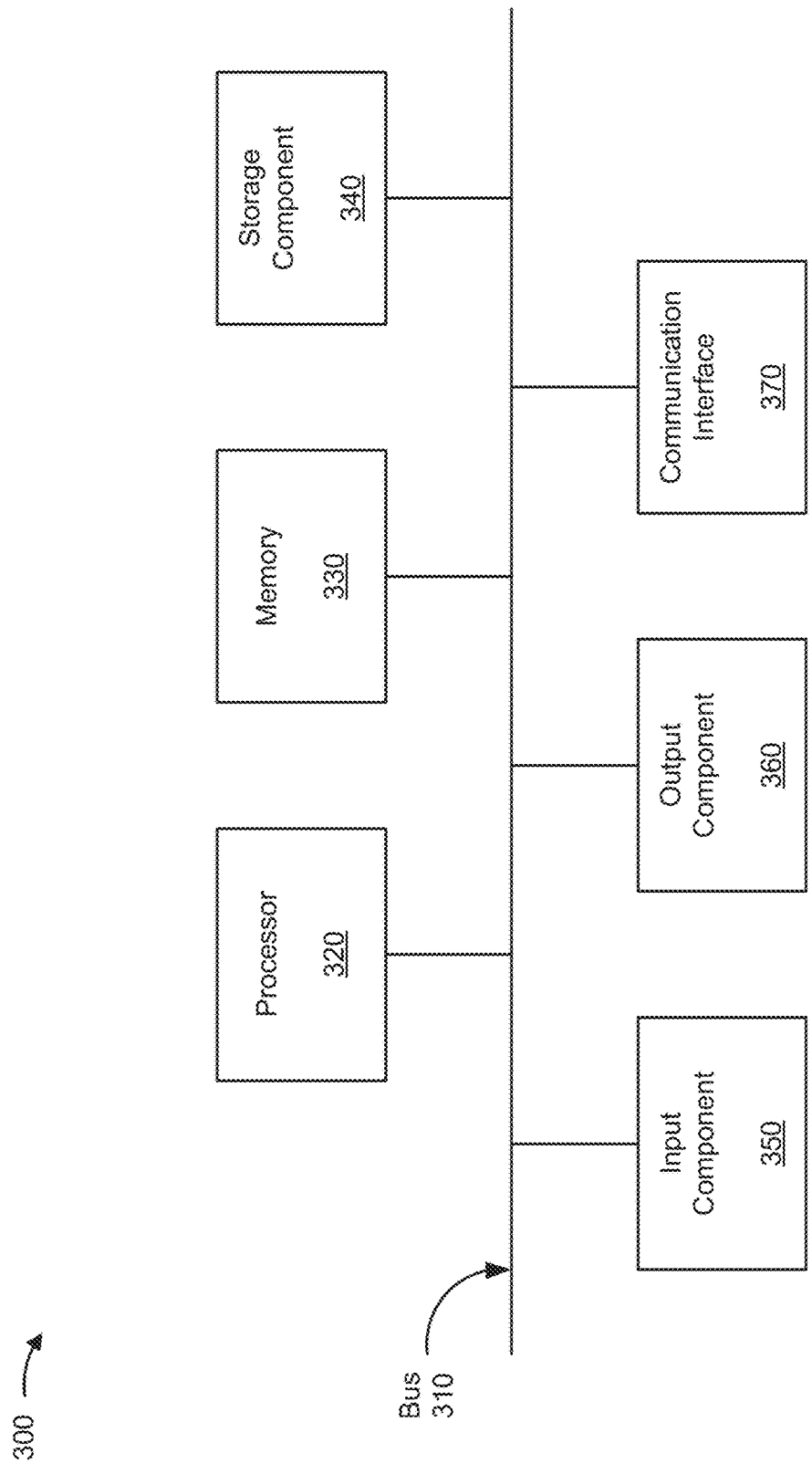
FIG. 3 is a diagram of example components of one or more devices of FIG. 2.

FIG. 3 is a diagram of example components of a device 300. Device 300 may correspond to projectable transaction card 210, navigation device 220, user device 230, and/or entity location device 240. In some implementations, projectable transaction card 210, navigation device 220, user device 230, and/or entity location device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 for account entity location based navigation and display for a projectable transaction card. In some implementations, one or more process blocks of FIG. 4 may be performed by a device (e.g., navigation device 220). In some implementations, one or more process blocks of FIG. 4 may be performed by another device or a group of devices separate from or including the navigation device, such as a user device or entity location device (e.g., user device 230 or entity location device 240), and/or the like.

As shown in FIG. 4, process 400 may include determining information that identifies a location of a projectable transaction card, wherein the projectable transaction card is associated with an account entity and wherein the projectable transaction card is associated with a user account associated with the account entity (block 410). For example, the device (e.g., using processor 320, memory 330, storage component 340, input component 350, output component 360, communication interface 370 and/or the like) may determine information that identifies a location of a projectable transaction card, as described above. In some implementations, the projectable transaction card is associated with an account entity. In some implementations, the projectable transaction card is associated with a user account associated with the account entity.

As further shown in FIG. 4, process 400 may include determining that the location of the projectable transaction card is in proximity to a location associated with the account entity (block 420). For example, the device (e.g., using processor 320, memory 330, storage component 340, input component 350, output component 360, communication interface 370 and/or the like) may determine that the location of the projectable transaction card is in proximity to a location associated with the account entity, as described above.

As further shown in FIG. 4, process 400 may include determining navigation information based on determining that the location of the projectable transaction card is in proximity to the location associated with the account entity, wherein the navigation information includes information for navigating from the location of the projectable transaction card to the location associated with the account entity (block 430). For example, the device (e.g., using processor 320, memory 330, storage component 340, input component 350, output component 360, communication interface 370 and/or the like) may determine navigation information based on determining that the location of the projectable transaction card is in proximity to the location associated with the account entity, as described above. In some implementations, the navigation information includes information for navigating from the location of the projectable transaction card to the location associated with the account entity.

As further shown in FIG. 4, process 400 may include providing the navigation information for display on a display screen of the projectable transaction card, wherein the navigation information is not provided for display on the display screen of the projectable transaction card prior to the location of the projectable transaction card being in proximity to the location associated with the account entity (block 440). For example, the device (e.g., using processor 320, memory 330, storage component 340, input component 350, output component 360, communication interface 370 and/or the like) may provide the navigation information for display on a display screen of the projectable transaction card, as described above. In some implementations, the navigation information is not provided for display on the display screen of the projectable transaction card prior to the location of the projectable transaction card being in proximity to the location associated with the account entity.

Process 400 may include additional implementations, such as any single implementation or any combination of implementations described below and/or in connection with one or more other processes described elsewhere herein.

In a first implementation, process 400 further comprises determining a type of the location associated with the account entity and identifying the type of the location associated with the account entity as an unfiltered location type, wherein providing the navigation information for display on the display screen of the projectable transaction card comprises providing the navigation information for display further based on identifying the type of the location associated with the account entity as an unfiltered location type.

In a second implementation, alone or in combination with the first implementation, process 400 further comprises determining that the location of the projectable transaction card is within a threshold distance of the location associated with the account entity, wherein determining that the location of the projectable transaction card is in proximity to the location associated with the account entity comprises determining that the location of the projectable transaction card is in proximity to the location associated with the account entity based on determining that the location of the projectable transaction card is within the threshold distance of the location associated with the account entity.

In a third implementation, alone or in combination with one or more of the first and second implementations, process 400 further comprises determining that the location of the projectable transaction card is within a geographical area associated with the account entity, wherein determining that the location of the projectable transaction card is in proximity to the location associated with the account entity comprises determining that the location of the projectable transaction card is in proximity to the location associated with the account entity based on determining that the location of the projectable transaction card is within the geographical area associated with the account entity.

In a fourth implementation, alone or in combination with one or more of the first through third implementations, process 400 further comprises providing, for display, a user interface associated with whether to display the navigation information and receiving, based on user input provided via the user interface, an indication that the navigation information is to be displayed, wherein providing the navigation information for display on the display screen of the projectable transaction card comprises providing the navigation information for display further based on the indication that the navigation information is to be displayed.

In a fifth implementation, alone or in combination with one or more of the first through fourth implementations, process 400 further comprises determining that an upcoming due date, associated with the user account, is within a time threshold, wherein providing the navigation information for display on the display screen of the projectable transaction card comprises providing the navigation information for display further based on determining that the upcoming due date is within the time threshold.

In a sixth implementation, alone or in combination with one or more of the first through fifth implementations, process 400 further comprises determining historical activity information associated with the user account and determining, based on the historical activity information, that activity associated with the user account is expected, wherein providing the navigation information for display on the display screen of the projectable transaction card comprises providing the navigation information for display further based on determining that the activity associated with the user account is expected.

In a seventh implementation, alone or in combination with one or more of the first through sixth implementations, process 400 further comprises determining information that identifies an updated location of the projectable transaction card, determining that the updated location of the projectable transaction card is not in proximity to the location associated with the account entity, and causing the navigation information to stop being displayed on the display screen of the projectable transaction card based on determining that the updated location of the projectable transaction card is not in proximity to the location associated with the account entity.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for account entity location based navigation and display for a projectable transaction card. In some implementations, one or more process blocks of FIG. 5 may be performed by a device (e.g., navigation device 220). In some implementations, one or more process blocks of FIG. 5 may be performed by another device or a group of devices separate from or including the navigation device, such as a user device or entity location device (e.g., user device 230 or entity location device 240), and/or the like.

As shown in FIG. 5, process 500 may include identifying a location of a projectable transaction card associated with an account entity, wherein the projectable transaction card is associated with a user account associated with the account entity (block 510). For example, the device (e.g., using processor 320, memory 330, storage component 340, input component 350, output component 360, communication interface 370 and/or the like) may identify a location of a projectable transaction card associated with an account entity, as described above. In some implementations, the projectable transaction card is associated with a user account associated with the account entity.

As further shown in FIG. 5, process 500 may include determining that the location of the projectable transaction card is within at least one of: a threshold distance of a location associated with the account entity, or a geographical area associated with the location of the account entity (block 520). For example, the device (e.g., using processor 320, memory 330, storage component 340, input component 350, output component 360, communication interface 370 and/or the like) may determine that the location of the projectable transaction card is within a threshold distance of a location associated with the account entity and/or a geographical area associated with the location of the account entity, as described above.

As further shown in FIG. 5, process 500 may include determining navigation information for navigating from the location of the projectable transaction card to the location associated with the account entity, wherein the navigation information is determined based on the location of the projectable transaction card being within the threshold distance or within the geographical area (block 530). For example, the device (e.g., using processor 320, memory 330, storage component 340, input component 350, output component 360, communication interface 370 and/or the like) may determine navigation information for navigating from the location of the projectable transaction card to the location associated with the account entity, as described above. In some implementations, the navigation information may be determined based on the location of the projectable transaction card being within the threshold distance or within the geographical area.

As further shown in FIG. 5, process 500 may include providing the navigation information for display on a display screen of the projectable transaction card, wherein the navigation information is not provided for display on the display screen of the projectable transaction card prior to the location of the projectable transaction card being within the threshold distance or within the geographical area (block 540). For example, the device (e.g., using processor 320, memory 330, storage component 340, input component 350, output component 360, communication interface 370 and/or the like) may provide the navigation information for display on a display screen of the projectable transaction card, as described above. In some implementations, the navigation information is not provided for display on the display screen of the projectable transaction card prior to the location of the projectable transaction card being within the threshold distance or within the geographical area.

Process 500 may include additional implementations, such as any single implementation or any combination of implementations described below and/or in connection with one or more other processes described elsewhere herein.

In a first implementation, the one or more processors are further configured to determine a type of the location associated with the account entity and identify the type of the location associated with the account entity as an unfiltered location type, wherein the one or more processors, when providing the navigation information for display on the display screen of the projectable transaction card, are configured to provide the navigation information for display further based on identifying the type of the location associated with the account entity as an unfiltered location type.

In a second implementation, alone or in combination with the first implementation, the one or more processors are further configured to provide, for display, a user interface associated with whether to display the navigation information and receive, based on user input provided via the user interface, an indication that the navigation information is to be displayed, and wherein the one or more processors, when providing the navigation information for display on the display screen of the projectable transaction card, are configured to provide the navigation information for display further based on the indication that the navigation information is to be displayed.

In a third implementation, alone or in combination with one or more of the first and second implementations, the one or more processors are further configured to determine that an upcoming due date, associated with the user account, is within a time threshold, and wherein the one or more processors, when providing the navigation information for display on the display screen of the projectable transaction card, are configured to provide the navigation information for display further based on determining that the upcoming due date is within the time threshold.

In a fourth implementation, alone or in combination with one or more of the first through third implementations, the one or more processors are further configured to determine historical activity information associated with the user account and determine, based on the historical activity information, that activity associated with the user account is expected, and wherein the one or more processors, when providing the navigation information for display on the display screen of the projectable transaction card, are configured to provide the navigation information for display further based on determining that the activity associated with the user account is expected.

In a fifth implementation, alone or in combination with one or more of the first through fourth implementations, the one or more processors are further configured to determine information that identifies an updated location of the projectable transaction card, determine that the updated location of the projectable transaction card is not within the threshold distance or within the geographical area of the location associated with the account entity, and cause the navigation information to stop being displayed on the display screen of the projectable transaction card based on determining that the updated location of the projectable transaction card is not within the threshold distance or the geographical area of the location associated with the account entity.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for account entity location based navigation and display for a projectable transaction card. In some implementations, one or more process blocks of FIG. 6 may be performed by a device (e.g., navigation device 220). In some implementations, one or more process blocks of FIG. 6 may be performed by another device or a group of devices separate from or including the navigation device, such as a user device or entity location device (e.g., user device 230 or entity location device 240), and/or the like.

As shown in FIG. 6, process 600 may include determining that a location of a projectable transaction card is in proximity to a location associated with an account entity, wherein the projectable transaction card is associated with the account entity, and wherein the projectable transaction card is associated with a user account associated with the account entity (block 610). For example, the device (e.g., using processor 320, memory 330, storage component 340, input component 350, output component 360, communication interface 370 and/or the like) may determine that a location of a projectable transaction card is in proximity to a location associated with an account entity, as described above. In some implementations, the projectable transaction card is associated with the account entity. In some implementations, the projectable transaction card is associated with a user account associated with the account entity.

As further shown in FIG. 6, process 600 may include determining navigation information based on determining that the location of the projectable transaction card is in proximity to the location associated with the account entity, wherein the navigation information includes information for navigating from the location of the projectable transaction card to the location associated with the account entity (block 620). For example, the device (e.g., using processor 320, memory 330, storage component 340, input component 350, output component 360, communication interface 370 and/or the like) may determine navigation information based on determining that the location of the projectable transaction card is in proximity to the location associated with the account entity, as described above. In some implementations, the navigation information includes information for navigating from the location of the projectable transaction card to the location associated with the account entity.

As further shown in FIG. 6, process 600 may include providing the navigation information for display on a display screen of the projectable transaction card, wherein the navigation information is not provided for display on the display screen of the projectable transaction card prior to the location of the projectable transaction card being in proximity to the location associated with the account entity (block 630). For example, the device (e.g., using processor 320, memory 330, storage component 340, input component 350, output component 360, communication interface 370 and/or the like) may provide the navigation information for display on a display screen of the projectable transaction card, as described above. In some implementations, the navigation information is not provided for display on the display screen of the projectable transaction card prior to the location of the projectable transaction card being in proximity to the location associated with the account entity.

Process 600 may include additional implementations, such as any single implementation or any combination of implementations described below and/or in connection with one or more other processes described elsewhere herein.

In a first implementation, the one or more instructions, when executed by the one or more processors, further cause the one or more processors to determine a type of the location associated with the account entity and identify the type of the location associated with the account entity as an unfiltered location type, and wherein the one or more instructions, that cause the one or more processors to provide the navigation information for display on the display screen of the projectable transaction card, cause the one or more processors to provide the navigation information for display further based on identifying the type of the location associated with the account entity as an unfiltered location type.

In a second implementation, alone or in combination with the first implementation, the one or more instructions, when executed by the one or more processors, further cause the one or more processors to determine that the location of the projectable transaction card is within at least one of a threshold distance of the location associated with the account entity, or a geographical area associated with the location associated with the account entity, and wherein the one or more instructions, that cause the one or more processors to determine that the location of the projectable transaction card is in proximity to the location associated with the account entity, cause the one or more processors to determine that the location of the projectable transaction card is in proximity to the location associated with the account entity based on determining that the location of the projectable transaction card is within the threshold distance or within the geographical area.

In a third implementation, alone or in combination with one or more of the first and second implementations, the one or more instructions, when executed by the one or more processors, further cause the one or more processors to provide, for display, a user interface associated with whether to display the navigation information and receive, based on user input provided via the user interface, an indication that the navigation information is to be displayed, and wherein the one or more instructions, that cause the one or more processors to provide the navigation information for display on the display screen of the projectable transaction card, cause the one or more processors to provide the navigation information for display further based on the indication that the navigation information is to be displayed.

In a fourth implementation, alone or in combination with one or more of the first through third implementations, the one or more instructions, when executed by the one or more processors, further cause the one or more processors to determine that an upcoming due date, associated with the user account, is within a time threshold, and wherein the one or more instructions, that cause the one or more processors to provide the navigation information for display on the display screen of the projectable transaction card, cause the one or more processors to provide the navigation information for display further based on determining that the upcoming due date is within the time threshold.

In a fifth implementation, alone or in combination with one or more of the first through fourth implementations, the one or more instructions, when executed by the one or more processors, further cause the one or more processors to determine historical activity information associated with the user account and determine, based on the historical activity information, that activity associated with the user account is expected, and wherein the one or more instructions, that cause the one or more processors to provide the navigation information for display on the display screen of the projectable transaction card, cause the one or more processors to provide the navigation information for display further based on determining that the activity associated with the user account is expected.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    transmitting, by a projectable transaction card, location information to a device,
        wherein the projectable transaction card includes a transaction card that includes a display screen on the transaction card;
        wherein the projectable transaction card is associated with an account entity, and
        wherein the location information is associated with a location of the projectable transaction card;
    receiving, by the projectable transaction card and from the device and based on the location of the projectable transaction card being in proximity to a location associated with the account entity, navigation information for display on the display screen of the projectable transaction card,
        wherein the navigation information is determined to be provided by the device based on a pattern of account activity determined from historical account activity, and
        wherein the navigation information includes directions for navigating from the location of the projectable transaction card to the location associated with the account entity; and
    providing, for display by the projectable transaction card, the navigation information via the display screen of the projectable transaction card,
        wherein the navigation information is not provided for display on the display screen of the transaction card prior to the location of the projectable transaction card being in proximity to the location associated with the account entity.

2. The method of claim 1, wherein the navigation information is displayed as one or more of:
one or more alphanumeric characters,
a map, or
one or more symbols.

3. The method of claim 1, further comprising:
receiving updated location information associated with an updated location of the projectable transaction card; and
preventing the display screen from providing the navigation information.

4. The method of claim 1, wherein providing the navigation information via the display screen is based on a determination that the projectable transaction card is within a threshold distance of the location associated with the account entity.

5. The method of claim 1, wherein the display screen is configured to additionally display one or more of:
an account identifier associated with the projectable transaction card,
a transaction indicator associated with the projectable transaction card, or
a name of an account holder associated with the projectable transaction card.

6. The method of claim 1, wherein transmitting the location information is based on a user interaction with the projectable transaction card.

7. The method of claim 1, wherein the projectable transaction card is configured with an identification of the location associated with the account entity, and further comprising:
detecting that the projectable transaction card is within a threshold distance of the location associated with the account entity based on the configuration, and
wherein transmitting the location is based on the detection that the projectable transaction is within the threshold distance of the location associated with the account entity.

8. A projectable transaction card, comprising:
one or more memories; and
one or more processors, coupled to the one or more memories, configured to:
transmit location information to a device,
wherein the projectable transaction card is associated with an account entity,
wherein the projectable transaction card includes a transaction card that includes a display screen on the transaction card, and
wherein the location information is associated with a location of the projectable transaction card;
receive, from the device and based on the location of the projectable transaction card being in proximity to a location associated with the account entity, navigation information for display on the display screen of the projectable transaction card,
wherein the navigation information is determined to be provided by the device based on a pattern of account activity determined from historical account activity, and
wherein the navigation information includes directions for navigating from the location of the projectable transaction card to the location associated with the account entity; and
provide, for display by the projectable transaction card, the navigation information via the display screen of the projectable transaction card,
wherein the navigation information is not provided for display on the display screen of the projectable transaction card prior to the location of the transaction card being in proximity to the location associated with the account entity.

9. The projectable transaction card of claim 8, wherein the navigation information is displayed as one or more of:
one or more alphanumeric characters,
a map, or
one or more symbols.

10. The projectable transaction card of claim 8, wherein the one or more processors are further configured to:
receive updated location information associated with an updated location of the projectable transaction card; and
prevent the display screen from providing the navigation information.

11. The projectable transaction card of claim 8, wherein the one or more processors, when providing the navigation information via the display screen, are configured to:
provide the navigation information based on a determination that the projectable transaction card is within a threshold distance of the location associated with the account entity.

12. The projectable transaction card of claim 8, wherein the display screen is configured to additionally display one or more of:
an account identifier associated with the projectable transaction card,
a transaction indicator associated with the projectable transaction card, or
a name of an account holder associated with the projectable transaction card.

13. The projectable transaction card of claim 8, wherein the one or more processors, when transmitting the location information, are configured to:
transmit the location information based on a user interaction with the projectable transaction card.

14. The projectable transaction card of claim 8, wherein the projectable transaction card is configured with an identification of the location associated with the account entity, and wherein the one or more processors are configured to:
detect that the projectable transaction card is within a threshold distance of the location associated with the account entity based on the configuration, and
wherein the one or more processors, when transmitting the location, are configured to:
transmit the location based on the detection that the projectable transaction is within the threshold distance of the location associated with the account entity.

15. A non-transitory computer-readable medium storing a set of instructions, the set of instructions comprising:
one or more instructions that, when executed by one or more processors of a projectable transaction card, cause the projectable transaction card to:
transmit location information to a device,
wherein the projectable transaction card is associated with an account entity,
wherein the projectable transaction card includes a transaction card that includes a display screen on the transaction card, and
wherein the location information is associated with a location of the projectable transaction card;

receive, from the device and based on the location of the projectable transaction card being in proximity to a location associated with the account entity, navigation information for display on the display screen of the projectable transaction card,
  wherein the navigation information includes directions for navigating from the location of the projectable transaction card to the location associated with the account entity; and
provide, for display by the projectable transaction card, the navigation information via the display screen of the projectable transaction card,
  wherein the navigation information is not provided for display on the display screen of the projectable transaction card prior to the location of the transaction card being in proximity to the location associated with the account entity, and
  wherein the one or more instructions, that cause the projectable transaction card to provide the navigation information via the display screen, cause the projectable transaction card to:
    provide the navigation information based on a determination that the projectable transaction card is within a threshold distance of the location associated with the account entity,
      wherein the threshold distance is determined by the device based on at least one of historical activity information associated with a user account or historical location information associated with the projectable transaction card.

16. The non-transitory computer-readable medium of claim 15, wherein the navigation information is displayed as one or more of:
one or more alphanumeric characters,
a map, or
one or more symbols.

17. The non-transitory computer-readable medium of claim 15, wherein the one or more instructions further cause the projectable transaction card to:
receive updated location information associated with an updated location of the projectable transaction card; and
prevent the display screen from providing the navigation information.

18. The non-transitory computer-readable medium of claim 15, wherein the one or more instructions, wherein the navigation information is determined to be provided by the device based a pattern of account activity determined from historical account activity.

19. The non-transitory computer-readable medium of claim 15, wherein the one or more instructions further cause the projectable transaction card to additionally display one or more of:
an account identifier associated with the projectable transaction card,
a transaction indicator associated with the projectable transaction card, or
a name of an account holder associated with the projectable transaction card.

20. The non-transitory computer-readable medium of claim 15, wherein the projectable transaction card is configured with local access to a set of maps associated with the location information associated with the account entity.

* * * * *